US011432698B2

(12) United States Patent
Knutson et al.

(10) Patent No.: US 11,432,698 B2
(45) Date of Patent: Sep. 6, 2022

(54) MOBILE ROBOTIC CLEANER

(71) Applicant: Nilfisk A/S, Broendby (DK)

(72) Inventors: Kipp Knutson, Brooklyn Park, MN (US); Stuart McDonald, Minnetonka, MN (US); Stephen Klopp, Champlin, MN (US); John Black, Brooklyn Park, MN (US); Dave Wood, Brooklyn Park, MN (US); Donald Joseph Legatt, St. Michael, MN (US)

(73) Assignee: Nilfisk A/S, Broendby (DK)

( * ) Notice: Subject to any disclaimer, the term of this patent is extended or adjusted under 35 U.S.C. 154(b) by 0 days.

(21) Appl. No.: 16/885,835

(22) Filed: May 28, 2020

(65) Prior Publication Data
US 2020/0288936 A1 Sep. 17, 2020

Related U.S. Application Data

(63) Continuation of application No. 15/240,991, filed on Aug. 18, 2016, now abandoned.
(Continued)

(51) Int. Cl.
*A47L 11/40* (2006.01)
*A47L 11/30* (2006.01)

(52) U.S. Cl.
CPC .......... *A47L 11/4011* (2013.01); *A47L 11/305* (2013.01); *A47L 11/4008* (2013.01);
(Continued)

(58) Field of Classification Search
CPC ...... A47L 11/4011; A47L 11/04; A47L 11/06; A47L 2201/04; A47L 2201/06
(Continued)

(56) References Cited

U.S. PATENT DOCUMENTS 4,114,711 A * 9/1978 Wilkins .............. A47L 11/4011
15/319
5,086,535 A * 2/1992 Grossmeyer ........ A47L 11/4011
15/319
(Continued)

FOREIGN PATENT DOCUMENTS

DE        10240227 A1    3/2004
DE      102013113426 A1    6/2014
(Continued)

OTHER PUBLICATIONS

International Search Report and Written Opinion from PCT Application Serial No. PCT/US2016/47638, dated Nov. 2, 2016, 10 pages.
(Continued)

*Primary Examiner* — Joel D Crandall
(74) *Attorney, Agent, or Firm* — Kinney & Lange, P.A.

(57) ABSTRACT

A control system for a robotic floor cleaning machine configured to perform a cleaning operation along a cleaning path can comprise a controller, and a plurality of sensors. The controller can be configured to control autonomous movement of the robotic floor cleaning machine along the cleaning path and autonomous performance of the cleaning operation. The plurality of sensors can be configured to sense a location of the robotic floor cleaning machine relative to surroundings of the robotic floor cleaning machine. At least two sensors from the plurality of sensors are configured to locate the robotic floor cleaning machine in overlapping areas of the surroundings.

21 Claims, 6 Drawing Sheets

Related U.S. Application Data

(60) Provisional application No. 62/206,673, filed on Aug. 18, 2015.

(52) U.S. Cl.
CPC ....... *A47L 11/4016* (2013.01); *A47L 11/4036* (2013.01); *A47L 11/4044* (2013.01); *A47L 11/4061* (2013.01); *A47L 11/4066* (2013.01); *A47L 11/4083* (2013.01); *A47L 11/4088* (2013.01); *A47L 2201/04* (2013.01); *A47L 2201/06* (2013.01)

(58) Field of Classification Search
USPC .................................. 15/319, 320
See application file for complete search history.

(56) References Cited

U.S. PATENT DOCUMENTS

| | | | |
|---|---|---|---|
| 5,279,672 A | | 1/1994 | Betker et al. |
| 5,341,540 A | * | 8/1994 | Soupert ............... A47L 11/4011 15/319 |
| 5,995,883 A | * | 11/1999 | Nishikado ............... G01S 7/497 701/23 |
| 6,574,536 B1 | * | 6/2003 | Kawagoe ............... G05D 1/0033 15/319 |
| 7,113,847 B2 | | 9/2006 | Chmura et al. |
| 8,528,142 B1 | | 9/2013 | Pedlar et al. |
| 8,887,340 B2 | | 11/2014 | Pedlar et al. |
| 2002/0153184 A1 | | 10/2002 | Song et al. |
| 2004/0020000 A1 | | 2/2004 | Jones |
| 2004/0211444 A1 | | 10/2004 | Taylor et al. |
| 2006/0184293 A1 | | 8/2006 | Konandreas et al. |
| 2007/0061040 A1 | | 3/2007 | Augenbraun et al. |
| 2007/0209143 A1 | | 9/2007 | Choi et al. |
| 2008/0127445 A1 | | 6/2008 | Konandreas et al. |
| 2009/0133720 A1 | | 5/2009 | Van Den Bogert |
| 2010/0211244 A1 | | 8/2010 | Jeong et al. |
| 2011/0004339 A1 | | 1/2011 | Ozick et al. |
| 2011/0004342 A1 | * | 1/2011 | Knopow ............... A47L 5/28 700/253 |
| 2011/0046784 A1 | | 2/2011 | Anderson |
| 2013/0238130 A1 | * | 9/2013 | Dorschel ............... G05D 1/0274 700/259 |
| 2013/0261867 A1 | | 10/2013 | Burnett et al. |
| 2014/0166047 A1 | * | 6/2014 | Hillen ............... A47L 11/4061 134/6 |
| 2014/0188325 A1 | | 7/2014 | Johnson et al. |
| 2014/0230179 A1 | | 8/2014 | Matsubara et al. |
| 2014/0289992 A1 | | 8/2014 | Matsubara et al. |
| 2019/0179307 A1 | | 6/2019 | Anderson et al. |

FOREIGN PATENT DOCUMENTS

| | | |
|---|---|---|
| DE | 102014106975 A1 | 11/2015 |
| EP | 2725443 A2 | 4/2014 |
| EP | 2801313 A2 | 11/2014 |
| KR | 1020110127946 A | 11/2011 |
| WO | WO2013130734 A1 | 9/2013 |
| WO | 2015041036 A1 | 3/2015 |
| WO | WO2017031365 A1 | 2/2017 |

OTHER PUBLICATIONS

International Preliminary Report on Patentability for PCT Application Serial No. PCT/US2016/47638, dated Feb. 20, 2018, 9 pages.
Extended European Search Report for EP Application No. 16837867.7, dated Mar. 15, 2019, 7 pages.
Communication pursuant to Rule 114(2) EPC from EP Application No. 16837867.7, dated Jun. 7, 2021, 5 Pages.

* cited by examiner

MOBILE ROBOTIC CLEANER

CROSS-REFERENCE TO RELATED APPLICATION(S)

This application is a continuation of U.S. application Ser. No. 15/240,991, filed Aug. 18, 2016, for "MOBILE ROBOTIC CLEANER" by K. Knutson, S. McDonald, S. Klopp, J. Black, D. Wood and D. Legatt, which in turn claims the benefit of U.S. Provisional Application No. 62/206,673, filed Aug. 18, 2015, for "MOBILE ROBOTIC CLEANER" by K. Knutson, S. McDonald, S. Klopp, J. Black, D. Wood and D. Legatt.

TECHNICAL FIELD

The present patent application relates generally to a cleaning apparatus. More specifically, the present patent application relates, but not by way of limitation, to various features of a mobile robotic cleaner for autonomous floor cleaning.

BACKGROUND

Industrial and commercial floors are cleaned on a regular basis for aesthetic and sanitary purposes. There are many types of industrial and commercial floors ranging from hard surfaces such as concrete, terrazzo, wood, and the like, which can be found in factories, schools, hospitals, and the like, to softer surfaces such as carpeted floors found in restaurants and offices. Different types of floor cleaning equipment such as scrubbers, sweepers, and extractors, have been developed to properly clean and maintain these different floor surfaces.

For example, a typical industrial or commercial scrubber is a walk-behind or drivable, self-propelled, wet process machine that applies a liquid cleaning solution from an onboard cleaning solution tank onto the floor through nozzles. Rotating brushes forming part of the scrubber agitate the solution to loosen dirt and grime adhering to the floor. The dirt and grime become suspended in the solution, which is collected by a vacuum squeegee fixed to a rearward portion of the scrubber and deposited into an onboard recovery tank.

Floor cleaning units can also be designed as unmanned, robotic units that operate autonomously. However, there are particular challenges in automating the cleaning process of an autonomous scrubber, particularly for large, industrial or commercial floor cleaning systems that can be employed unsupervised in areas where there is pedestrian traffic. In addition to providing an adequate guidance or navigation system that prevents the unmanned, robotic unit from engaging objects or entering prohibited areas, the cleaning operation itself must be managed to ensure the unmanned, robotic unit is actually performing as intended.

OVERVIEW

The present inventors have recognized, among other things, that a problem to be solved with autonomous or robotic floor cleaning equipment is the failure of such equipment to recognize its surroundings and adequately react to changes in those surroundings. The present inventors have also recognized that a problem to be solved with autonomous or robotic floor cleaning equipment is the failure of such equipment to recognize and react to deficiencies of the cleaning operation being performed.

The present subject matter can help provide a solution to these and other problems such as by providing a robotic or autonomous cleaning machine that can utilize a control system to accurately detect when the cleaning machine may collide with an object. Thus, in order to operate properly, the robotic cleaning machine should be able to detect objects directly ahead of the cleaning machine, including ahead of the left forward and the right forward edges of the cleaning machine. Robotic cleaning machines should not only be able to detect objects, but they also should be able to process the information regarding object detection in sufficient time to avoid the object. Mapping of a workspace is also a desirable feature, which can allow the robotic cleaning machine to clean along a desired route.

The present subject matter can help provide a solution to these and other problems such as by providing a robotic or autonomous cleaning machine that can include a control system to monitor the status of the cleaning operation. For example, the control system can include sensors to determine the presence of a scrubbing pad, a squeegee, level sensors to determine the level of clean and dirty cleaning liquid, moisture sensors to determine the presence of un-vacuumed cleaning liquid behind the machine, vibration sensors, object recognition sensors and the like.

In an example, a control system for a robotic floor cleaning machine configured to perform a cleaning operation along a cleaning path can comprise a controller, and a plurality of sensors. The controller can be configured to control autonomous movement of the robotic floor cleaning machine along the cleaning path and autonomous performance of the cleaning operation. The plurality of sensors can be configured to sense a location of the robotic floor cleaning machine relative to surroundings of the robotic floor cleaning machine. At least two sensors from the plurality of sensors are configured to locate the robotic floor cleaning machine in overlapping areas of the surroundings.

In another example, a robotic floor cleaning machine can comprise a chassis, a propulsion system, a primary cleaning mechanism, a control system, and means for facilitating autonomous performance of a cleaning operation. The propulsion system can be connected to the chassis to provide movement of the chassis along a cleaning path. The primary cleaning mechanism can be mounted to the chassis to perform the cleaning operation. The control system can be mounted to the robotic floor cleaning machine to control autonomous movement of the chassis and autonomous performance of the cleaning operation. Furthermore, the robotic floor cleaning machine can comprise a liquid system mounted to the chassis to provide cleaning liquid to the cleaning operation, and a recovery system mounted to the chassis to recover liquid from the cleaning operation.

In yet another example, a robotic floor cleaning machine can comprise a chassis, a propulsion system, a primary cleaning mechanism, a control system, and means for facilitating autonomous movement of the chassis. The propulsion system can be connected to the chassis to provide movement of the chassis along a cleaning path. The primary cleaning mechanism can be mounted to the chassis to perform a cleaning operation. The control system can be mounted to the robotic floor cleaning machine to control the autonomous movement of the chassis and autonomous performance of the cleaning operation. Furthermore, the robotic floor cleaning machine can comprise a liquid system mounted to the chassis to provide cleaning liquid to the cleaning operation, and a recovery system mounted to the chassis to recover liquid from the cleaning operation.

DETAILED DESCRIPTION

Figure 1:
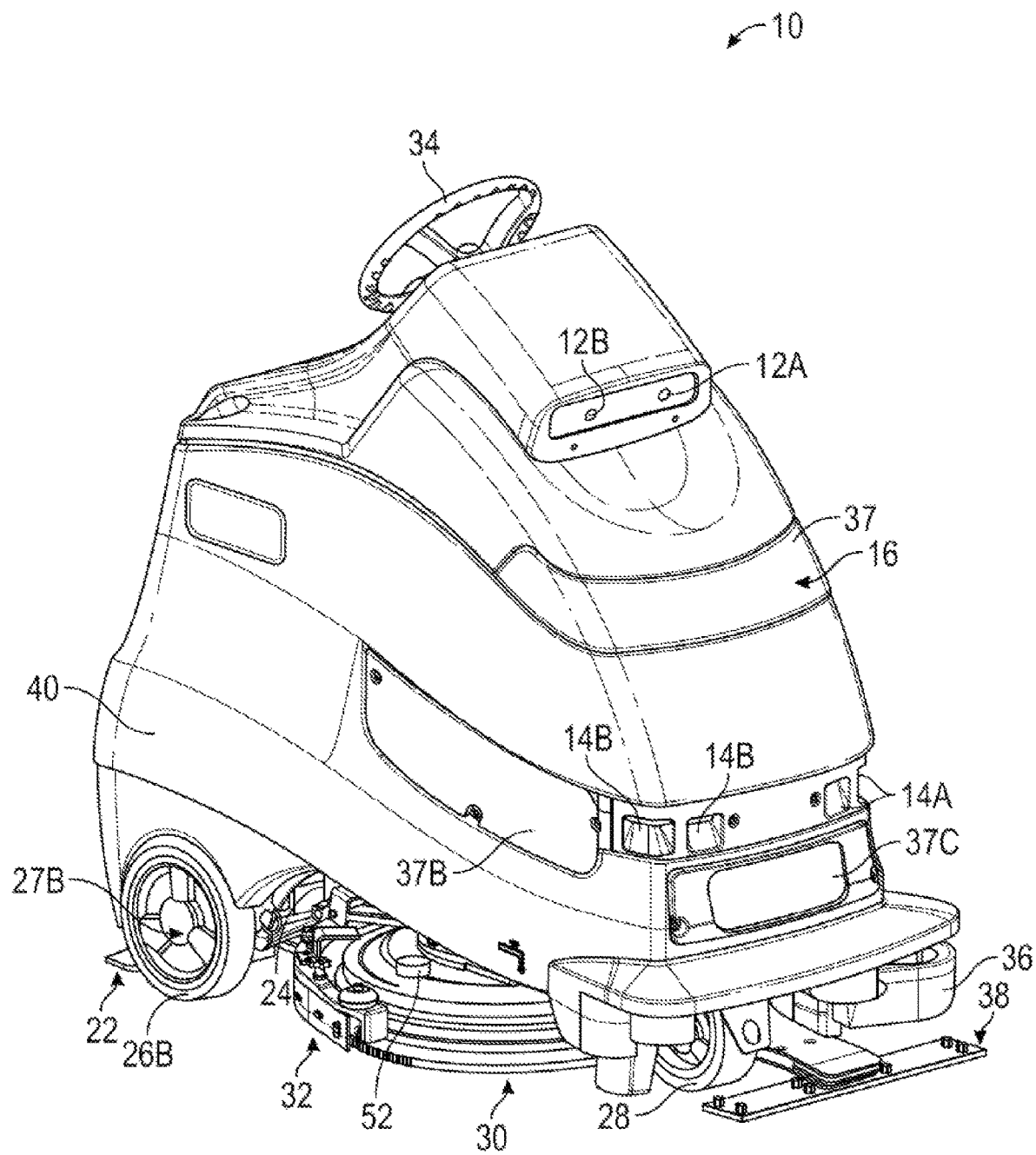
FIG. 1 is a front perspective view of a robotic floor cleaning machine having optical sensors, distance sensors, a laser scanner and a status light system.
Figure 2:
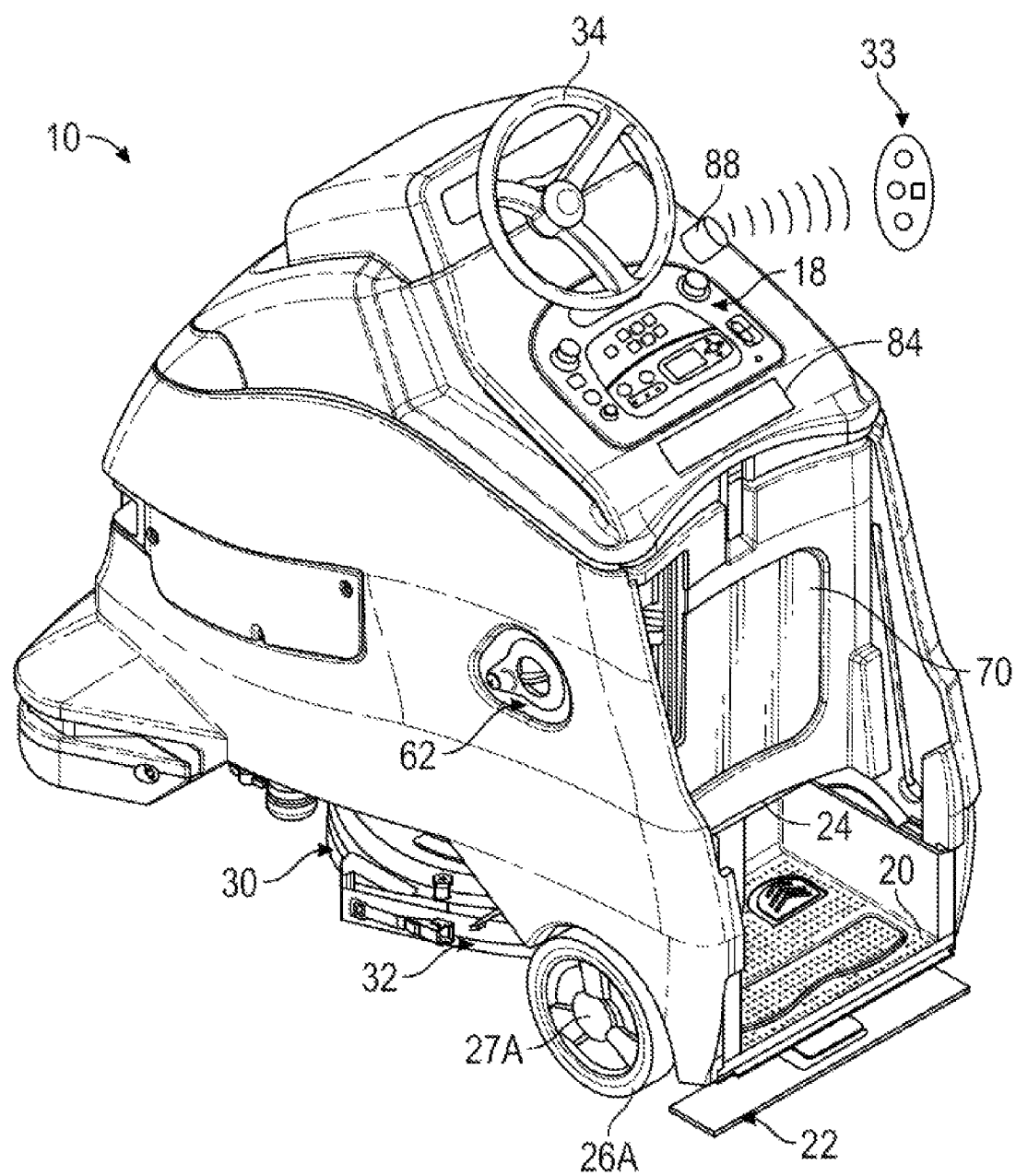
FIG. 2 is a rear perspective view of the robotic floor cleaning machine of FIG. 1 showing a control panel, an operator platform and a trailing mop pad.

FIG. 1 is a front perspective view of floor cleaning machine 10 having optical sensors 12A and 12B, distance sensors 14A and 14B, and a status light system 16. FIG. 2 is a rear perspective view of floor cleaning machine 10 of FIG. 1 showing control panel 18, operator platform 20, and trailing mop system 22. Machine 10 can include chassis 24 to which wheels 26A, 26B and 28 can be connected. Chassis 24 can support various cleaning devices, such as trailing mop system 22, scrubber 30 and squeegee 32. Chassis 24 can be connected to or form part of platform 20. Control panel 18 can be in electronic communication with remote device 33. FIGS. 1 and 2 are discussed concurrently.

Floor cleaning machine 10 can be configured to clean, treat, scrub, or polish a floor surface, or perform other similar actions using, for example, trailing mop system 22, scrubber 30 and squeegee 32. An operator can stand on platform 20 and control machine 10 using control panel 18 and steering wheel 34. Alternatively, optical sensors 12A and 12B and distance sensors 14A and 14B, as well as laser scanner 36 and personnel sensors 37A-37C, can allow machine 10 to autonomously drive itself. The present application describes various features that can be used to facilitate autonomous cleaning and autonomous driving of machine 10. The features described in the present application can be applied to any type of floor cleaning equipment, such as scrubbers, sweepers, and extractors, whether autonomous or user operated.

Figure 4A:
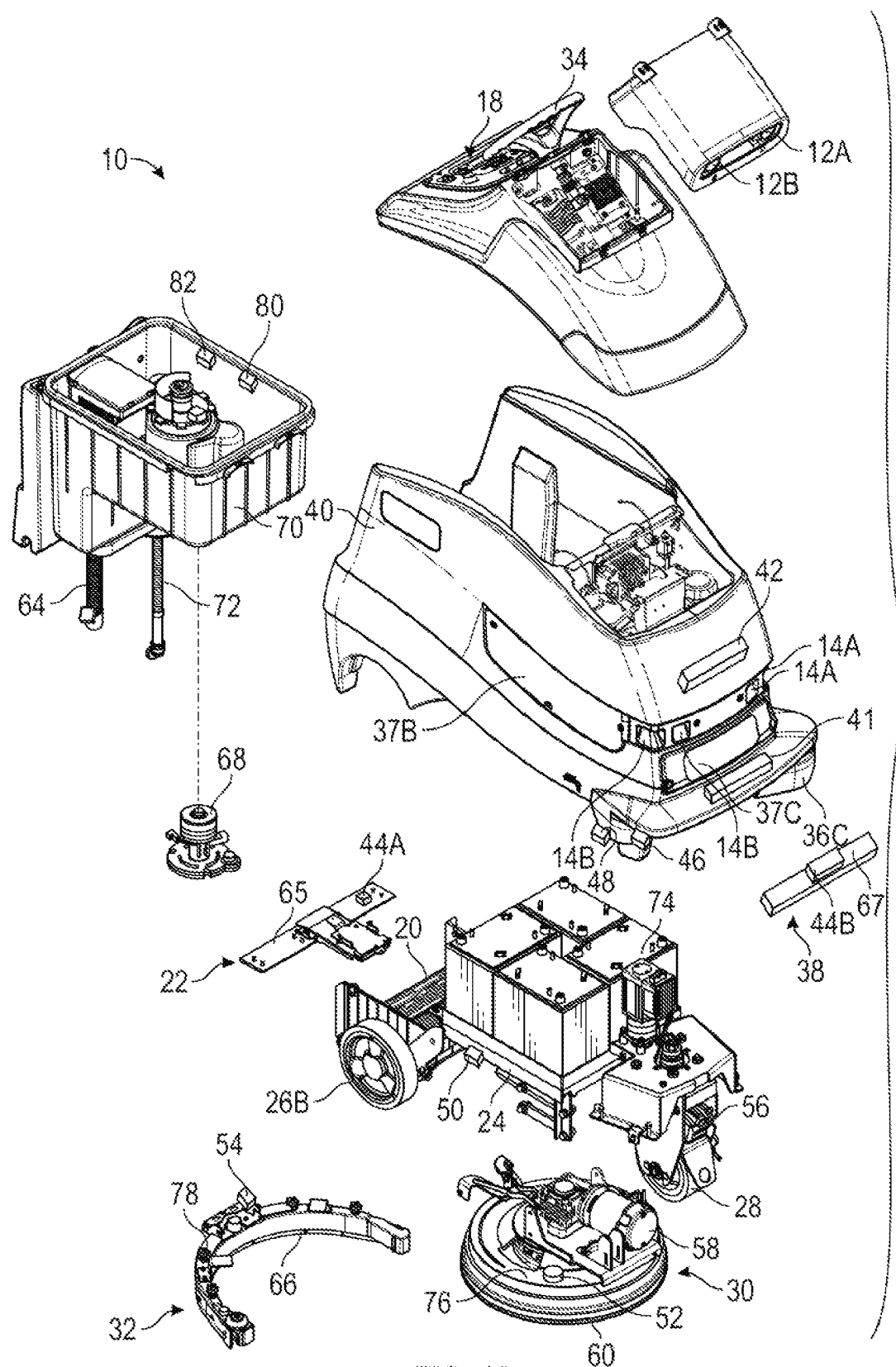
FIG. 4A is an exploded view of the robotic floor cleaning machine of FIG. 3 showing the location of the various sensors and cleaning devices.
Figure 4B:
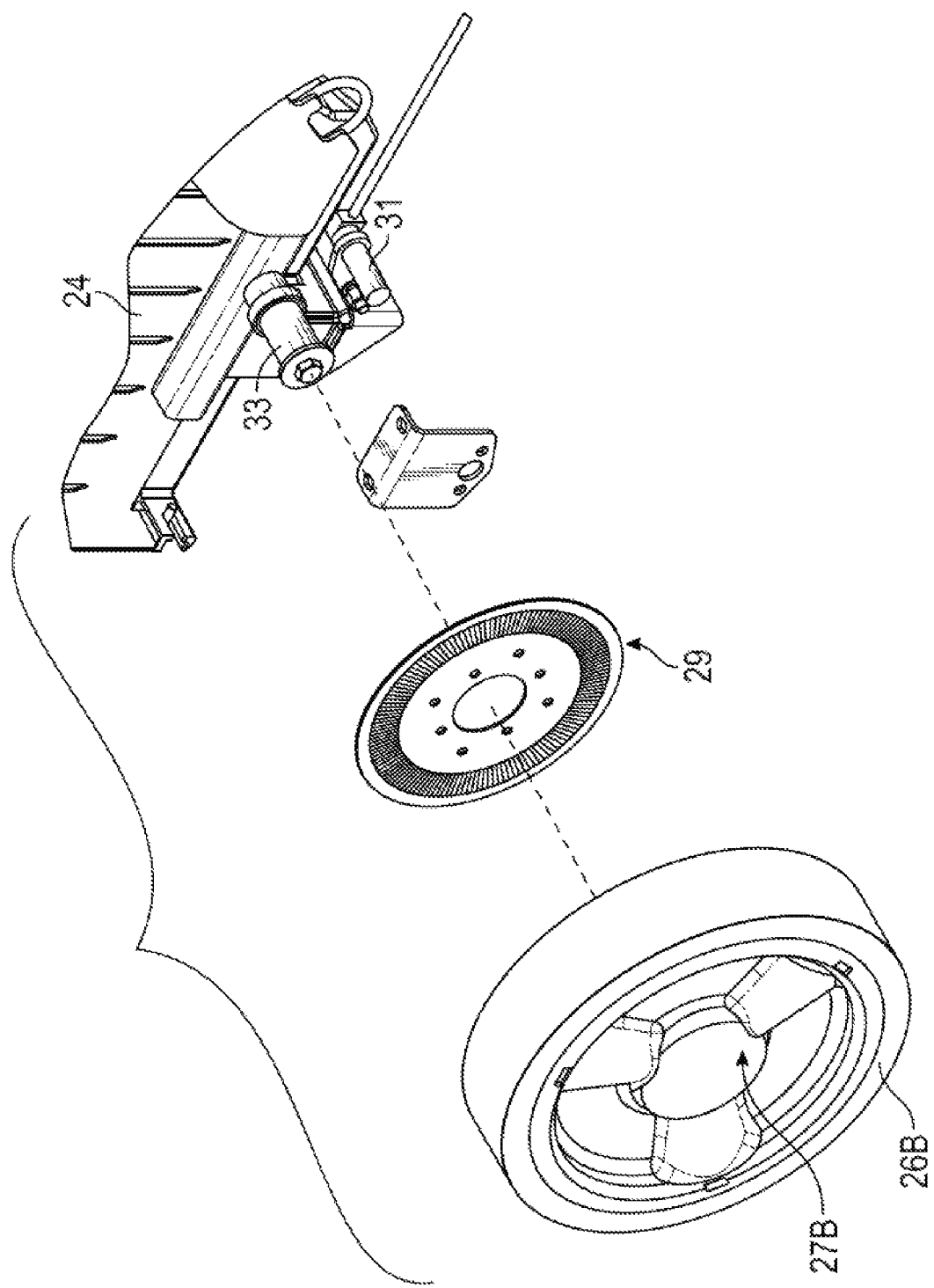
FIG. 4B is an exploded view of a wheel encoder for a wheel of the robotic floor cleaning machine shown in FIG. 4A.

Platform 10 can support the weight of an operator in a standing position. In other examples, machine 10 can be configured to accommodate a sitting operator. Machine 10 can be of a three wheel design having two wheels 26A and 26B generally behind the center of gravity of machine 10 and one wheel 28 in front of the center of gravity. In an example, platform 20 can be located behind the center of gravity. Front wheel 28 can be both a steered wheel and a driven wheel. Front wheel 28 can have a device for determining the angular position of the driving direction about the steering axis. In an example, rear wheels 26A and 26B are not driven but have one or more devices, such as encoders 27A and 27B, respectively, for determining speed of rotation each wheel. In an example, rear wheels 26A and 26B are not driven but have one or more devices such as an encoder for determining speed of rotation each wheel. The angular position of each wheel 26A, 26B, and the angular position and steering angle of wheel 28 can be used to determine the position of machine 10 relative to objects sensed by optical sensors 12A and 12B and distance sensors 14A and 14B, as well as laser scanner 36 in mapping an environment of machine 10. For example, FIG. 4B shows encoder 27B as having counter wheel 29 and optical scanner 31. Optical scanner 31 can count timing or tick marks on counter wheel 29 to determine how many revolutions wheel 26B has made when mounted on spindle 33, which can be translated by electronics within control panel 18 to a distance traveled by machine 10, such as by using the diameter of wheel 26.

Machine 10 can be electrically operated and can include a battery (e.g., battery 74 of FIG. 4A) for powering the various components of machine 10. Motors within machine 10 (not shown) or steering wheel 34 can be used to turn wheel 28. Additionally, wheel 28 can be connected to a prime mover, such as an electric motor (e.g., motor 56 of FIG. 4A), that provides propulsive force to machine 10.

Scrubber 30 can be configured to provide a cleaning action to the floor, such rotary disc, orbital or cylindrical cleaning. Fluid from a liquid cleaning system disposed within main cowling 40 can be dispensed by machine 10 to facilitate scrubbing performed by scrubber 30. A liquid system can include a liquid storage tank, a pump system, and spray nozzles, as discussed below. Squeegee 32 can be used to corral or wipe dirty fluid behind scrubber 30 and can be connected to a recovery system having a tank (e.g., tank 70 of FIG. 4A) disposed within main cowling 40. A recovery system can include a suction tube (e.g., hose 64), a suction motor (e.g., motor 68), and a storage tank (e.g., tank 70).

Optical sensors 12A and 12B, distance sensors 14A and 14B, and laser scanner 36, as well as the other sensors described herein, can be collectively referred to as a guidance or navigation system for machine 10 when operatively connected to electronics within control panel 18 as described herein. Machine 10 can also include other types of sensor to facilitate autonomous guidance, such as ambient light sensors. Optical sensors 12A and 12B can comprise video cameras that can record the environment of machine 10. Distance sensors 14A and 14B can comprise active ultrasonic sonar sensors or laser sensors that can generate high-frequency sound waves and evaluate the echo which is received back by the sensor, measuring the time interval between sending the signal and receiving the echo to determine the distance to an object. Distance sensors 14A and 14B, as well as other sensors, can be configured to sense changes in elevation so as to be able to detect stairs, ledges or other drop-offs. As such, electronics in control panel 18 can be configured to steer machine 10 away from potential hazards associated with drop-offs from stairs, steps, ledges and the like. Laser scanner 36 can generate three-dimensional data of the space around machine 10. Personnel sensors 37A-37C can be configured as capacitance sensors to detect the presence of people out from machine 10. Personnel sensors 37A-37C can distinguish between a solid object and a fluid or liquid filled object, such as a human, in order to make decisions concerning the navigation procedures.

Furthermore, optical sensors 12A and 12B, distance sensors 14A and 14B, laser scanner 36, wheel encoders 27A and 27B, and personnel sensors 37A-37C, as well as the various other sensors, cameras or input devices described herein, can be configured to provide redundant or overlapping input to the navigation system of the electronics of control panel 18 regarding the surroundings of machine 10. For example, two or more of optical sensors 12A and 12B, distance sensors 14A and 14B, laser scanner 36, wheel encoders 27A and 27B, and personnel sensors 37A-37C, as well as the various other sensors, cameras or input devices described herein, can be configured to provide the navigation system with distance data to the same object, shape information to the same object, depth information to the same object or other information. As such, control panel 18 and the navigation system will have multiple reference points to build a map for navigation of machine 10 and to prevent machine 10 from entering areas or impacting objects that machine 10 should not enter or impact.

Control panel 18 can be connected to electronics that can be programmed to generate mapping of locations that machine 10 has visited. Thus, as machine 10 is used throughout a facility, control panel 18 can add new places to the map and continuously refine the mapping of existing places, using the angular position of wheels 26A, 26B and 28. Machine 10 can use optical sensors 12A and 12B, distance sensors 14A and 14B, and laser scanner 36 to recognize the surroundings of machine 10 to place machine 10 into the mapped area. Both two-dimensional and three-dimensional mapping can be logged into memory of electronics connected to control panel 18. Thus, routes for the cleaning paths of vehicle 10 can be recorded in the mapped area for various cleaning operations. Machine 10 can provide an indication to an operator regarding the status of the location of machine 10 relative to the mapped area. For example, status light system 16 can light up in a particular pattern or color to indicate that machine 10 is in a known location, is currently mapping a new location, is paused, or some other such indication.

Status light system 16 can be provided to communicate various statuses of machine 10 to the operator, other personnel or other pedestrians in the line-of sight of machine 10 and status light system 16. Status light system 16 can include one or more visual indicators, such as light-emitting diodes (LEDs) or other light sources. The light bulbs can be positioned behind lens 37 to convey information to people in proximity of machine 10. For example, a solid white light can indicate that the machine is ready for operation, green can indicate that machine 10 is actively and correctly performing a cleaning operation, a flashing blue light on one side of machine 10 can indicate that machine 10 is about to make a turn to the side of the flashing blue light, a yellow light can indicate that machine 10 has stopped the cleaning process because of a detected or sensed condition, and a red light can indicate that machine 10 is malfunctioning. Other types of indicators can also be used to convey information to close-by people, such as digital text displays or audio alarms from a loudspeaker, such as voice prompts and horn sounds. Status light system 16 can be connected to electronics within control panel 18 to receive information from sensors in machine 10 to provide predictive turning information to bystanders. For example, if an object is sensed in the path of machine 10 and control panel 18 calculates that the path of machine 10 needs to be rerouted, status light system 16 can be used to provide information to a bystander that machine 10 will be changing path.

While machine 10 is in a robot or autonomous operating mode, it can be desirable to monitor and facilitate the driving and cleaning operations being executed by the various systems of machine 10. During user operation of machine 10, an operator drives machine 10 to maintain the cleaning path and avoid colliding with stationary and moving objects that are or can potentially become in the driving path of machine 10. Likewise, during user operation of machine 10, an operator is present to utilize sensory input to monitor the cleaning process, such as by watching for small objects in the cleaning path or observing torn squeegees or failing scrub pads. However, during autonomous operation, machine 10 can include various sensing and monitoring equipment as well as various supplementary cleaning equipment to ensure machine 10 autonomously drives in a safe manner and to ensure the cleaning operation continues in a proper and efficient manner. Machine 10 can include remote device 33 that can be carried by a remote operator of machine 10 to receive updates on the operation of machine 10 from control panel 18, or directly from a sensor, or to provide command instructions to control panel 18 or machine 10. For example, fob 90 of FIG. 5 can communicate with control panel 18 via a wireless connection to convey information via indicators 92A, 92B and 92C or provide instructions via button 93.

In an example, trailing mop system 22 can be used to absorb residual moisture left behind by squeegee 32, if any. For example, squeegee 32 may become compromised such that dirty water from scrubber 30 is not properly transferred to the recovery system by squeegee 32. As such, in the case of autonomous operation of machine 10, it might not become noticed by an operator not at the site of machine 10 that liquid is being left behind. As such trailing mop system 22 can be used to absorb undesirable liquid trailing behind machine 10 during operation. Furthermore, trailing mop system 22 can include a sensor (e.g., dirt sensor 44A of FIGS. 3 and 4) that can alert machine 10 or an operator having remote device 33 in electronic communication with machine 10 of the presence of liquid in trailing mop system 22. As such, a remote operator of machine 10 can be alerted to the possible compromise of a squeegee blade (e.g. blade 66 of FIG. 4A) in squeegee 32.

As will be discussed in greater detail with reference to FIGS. 2-5, machine 10 can be outfitted with a variety of different instruments, systems, sensors and devices to enable and improve the autonomous operation of machine 10. Examples of machine 10 described herein can improve the efficiency of the cleaning or treating operation such as by reducing or eliminating deficient cleaning procedures and executing a consistent cleaning or treating operation, free of variability that can be introduced from procedure imperfections or operator error or variability. Furthermore, examples of machine 10 described herein can improve the efficiency and operation of navigation instructions provided to machine 10 to improve the safety, reliability and cleaning or treating performance of machine 10.

Figure 3:
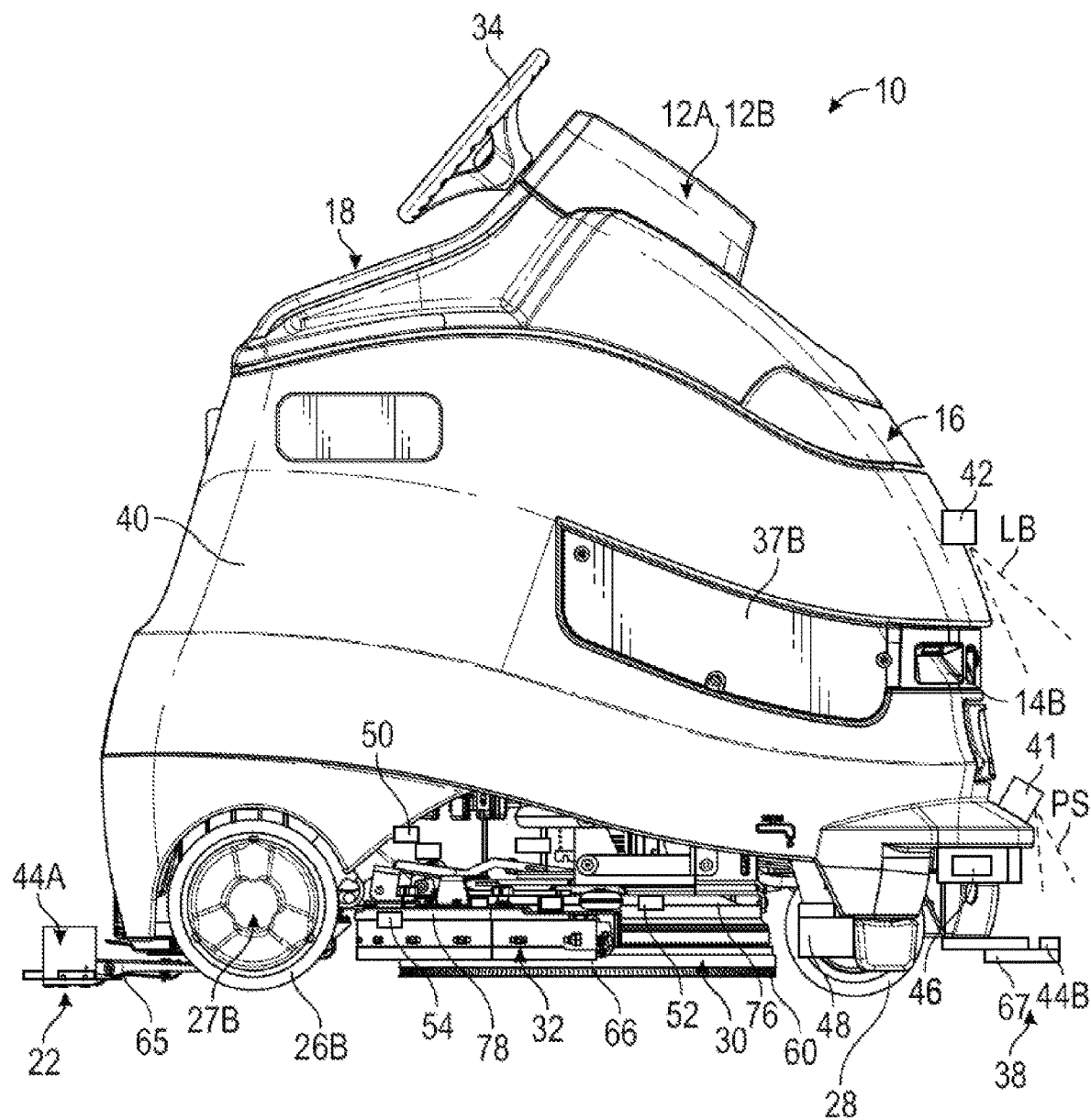
FIG. 3 is a side view of the robotic floor cleaning machine of FIGS. 1 and 2 showing various sensors and cleaning devices that can be added to the robotic floor cleaning machine to facilitate autonomous operation and cleaning of the robotic floor cleaning machine.

FIG. 3 is a side view of floor cleaning machine 10 of FIGS. 1 and 2 showing various sensors and cleaning devices that can be used to automate operation and cleaning of floor cleaning machine 10. FIG. 4A is an exploded view of floor cleaning machine 10 of FIG. 3 showing the location of the various sensors and cleaning devices. FIG. 4B is an exploded view of wheel encoder 27B for wheel 26B of robotic floor cleaning machine 10 shown in FIG. 4A.

In addition to trailing mop system 22, machine 10 can include various supplementary cleaning devices, such as front mop 38 and sprayer 41. Machine 10 can also include various hardware and sensors to facilitate and monitor the cleaning and driving operations of machine 10, such as projector 42, dirt sensors 44A and 44B, object recognition sensor 46, floor type sensor 48, vibration sensor 50, cleaning media sensor 52, and squeegee sensor 54. As shown in FIG. 4A, machine 10 can also include tank level sensor 80 and tank condition sensor 82.

During a cleaning operation of machine 10, motor 56 of a propulsion system can be actuated to roll wheel 28 along the floor surface to be cleaned. While machine 10 is rolling on wheels 26A, 26B and 28, motor 58 of scrubber 30 can be activated to rotate scrubbing pad 60. Cleaning solution or liquid can be added to a storage space within main cowling 40 through cap 62. Cleaning solution or liquid can be dispensed from within main cowling 40 to the area of scrubbing pad 60 via an actuator valve system (not shown), preferably to an area forward of scrubbing pad 60. Suction hose 64 can be connected to squeegee 32 to vacuum up dirty cleaning solution behind scrubbing pad 60 and in front of the squeegee blade 66. Vacuum motor 68 draws the dirty cleaning solution into tank 70. Vacuum motor 68 can also be used to pump dirty cleaning solution out of tank 70 via hose 72. Motors 56, 58 and 68 can receive power from battery 74. Electronics within control panel 18 can be used to operate motors 56, 58 and 68. The electronics within control panel 18 can also be used to operate various sensors and devices on machine 10 to ensure that the dispensing system, scrubber 30, squeegee 32 and the recovery system are functioning correctly and performing a proper cleaning operation.

As discussed above, trailing mop system 22 can be used as a supplementary recovery system for squeegee 32. Trailing mop system 22 can include another cleaning medium such, as a chamois, absorbent roller, sponge, mop, microfiber, or other absorbent material that can contact the floor behind blade 66 of squeegee 32 to wipe any water or fluid that may be left behind. Trialing mop system 22 can include frame member 65 to which the cleaning medium can be mounted. Frame member 65 can have a width approximately as wide as scrubber 30 or squeegee 32. However, frame member 65 can be as wide as the width of machine 10 and the distance between wheels 26A and 26B. Trailing mop system 22 and frame member 65 can be mounted to chassis 24 in any suitable manner, either in a fixed manner or an adjustable manner. Trailing mop system 22 can be connected to a motor mechanism (not shown) and can be raised and lowered automatically by a user-initiated input at control panel 18. In other examples, trailing mop system 22 can be raised or lowered manually, or added and removed from chassis 24 manually.

Sensor 44A can be provided on or in trailing mop system 22 to determine a moisture level in the cleaning medium or absorbent material. Sensor 44A can be mounted to frame member 65 or can be embedded within the cleaning medium. Sensor 44A can be configured as a moisture sensor, such as by including a pair of electrodes having a resistivity or capacitance that changes as more or less water is present. Sensor 44A can have a sensitivity level configured to indicate if squeegee 32 is trailing excessive water, which can be an indication of a freed or compromised squeegee blade 66. For example, sensor 44A can send a moisture signal to control panel 18 and electronics within control panel 18 can be programmed to trigger an alarm (e.g., on remote device 33) for an operator of machine 10 at a threshold that would be above incidental moisture left behind by squeegee 32.

Sensor 44A can also be configured as a dirt sensor to help electronics within control panel 18 make decisions about the cleaning operation. Sensor 44B can be provided at front mop 38 to sense dirt in front of machine 10. Sensors 44A and 44B can be configured as microphones to detect dirt, as is known in the art. Sensors 44A and 44B can also be configured as optical sensors or cameras to view or visually determine the presence of dirt.

With both of sensors 44A and 44B, dirt sensing can take place both before and after machine 10 passes over an area. Comparisons can be made between a before and an after condition to determine a level of cleanliness of the floor and if additional cleaning is needed. For example, an image (e.g., a visible spectrum image, an image outside of humanly visible spectrum, a spectroscopy image) taken by sensor 44B (or object recognition sensor 46) can be compared with an image taken by sensor 44A to determine how effective scrubber 30 and squeegee 32 are currently performing. The dirt sensing method can also comprise comparing an image with a known baseline image, which can be a reference image of the actual floor that machine 10 is cleaning. For example, an image of a clean floor surface stored in memory within control panel 18 or object recognition sensor 46 can be compared with real time images taken by rear sensor 44B.

Electronics within control panel 18 can be programmed to ignore variables or imperfections in the floor, such as from painted stripes or grout lines. Comparisons between the before or reference image and the after image can be made either continuously in real-time or intermittently over programmed intervals to determine the cleanliness of the floor. For example, a dark area in the before image can indicate a dirty area that needs to be cleaned. If the dark area remains in the after image, control panel 18 can trigger an operator alarm (e.g., on remote device 33).

Also, if a dirty area is detected in front of machine 10, electronics within control panel 18 can take corrective action in a predictive manner. If control panel 18 detects a dirty area ahead of machine 10, control panel 18 can adjust the cleaning operation to be performed by scrubber 30, squeegee 32 or a liquid system. For example, control panel 18 can increase the scrub pressure or quantity of liquid from the liquid system, can increase the concentration of detergent in the cleaning solution, or can slow down the speed of machine 10 to potentially rectify the dirty floor detected by front sensor 44b.

Front mop 38 can be connected to chassis 24 to remove objects from the cleaning path of machine 10. Some objects, such as paper clip, scrap of paper, etc., may be too small to be detected by the navigation system and are not necessary to be avoided, e.g. machine 10 does not need to be rerouted around the object. These types of small objects can, however, become trapped under blade 66 of squeegee 32 and cause water trailing. Front mop 38 can include a cleaning medium, such as a dry mop, broom, damp mop, microfiber, etc. that is can be mounted at the front of chassis 24 in front of scrubber 30 to sweep this small debris before scrubbing. Front mop 38 can be connected to a vacuum system, such as that provided by suction motor 68, or some other collection system to collect debris caught by front mop 38.

Front mop 38 can include frame member 67 to which the cleaning medium can be mounted. Front mop can be connected to chassis 24 via any suitable connection, either in a fixed manner or an adjustable manner. Frame member 67 and the cleaning medium can have a width at least as wide as scrubber 30 or squeegee 32. Frame member 67 can also be as wide as the width of machine 10 and the distance between wheels 26A and 26B. However, frame member 67 and the cleaning medium can be configured to be significantly wider than machine 10. A wide mop can be used to complete a pre-sweep operation task more quickly. A mop wider than scrubber 30 or machine 10 can be used to reduce the number of passes required by machine 10 to clean the area. For example, a mop twice as wide as scrubber 30 can be used to sweep the floor in approximately half the time it would take scrubber 30 to clean the same floor area. Additionally, a pre-sweep operation can be conducted at higher speeds of machine 10 as compared to cleaning operations.

In some examples, front mop 38 can be connected to a motor mechanism (not shown) and can be raised and lowered automatically by a user-initiated input at control panel 18. In other examples, front mop 38 can be raised or lowered manually, or added and removed from chassis 24 manually.

Pre-cleaning or sweeping can be performed with front mop 38 as a separate operation prior to scrubbing. Front mop 38 can be ejected or lifted upon completion so scrubbing can be started. In one example, machine 10 can be programmed to perform a pre-sweep of the entire floor area that is to be cleaned. The operator of machine 10 can then remove front mop 38 (or raise front mop 38 from the floor for storage onboard machine 10) and the collected debris before machine 10 is programmed for cleaning using scrubber 30. In another example, front mop 38 can be connected to a vacuum system or some other system to remove the debris and store it for later disposal. Similarly, a wheel driven (unpowered) cylindrical sweeper, or motor driven sweeper, or vacuumized debris recovery system can also be used.

Machine 10 can include object recognition sensor 46, which can provide the ability to recognize what an object is (e.g., a person, pallet of parts, etc.), not just an obstacle that will require a new route. Object recognition sensor 46 can take a picture or image of an object and communicate the image to control panel 18. In an example, control panel 18 can communicate with the Internet or a local area network via a wireless communication network to access a library or database of reference images of known objects for comparison. Electronics within control panel 18 can compare the image obtained by object recognition sensor 46 to images in the reference database. Objects can be compared to determine whether it should be cleaned, should be avoided, or whether an operator should be notified. For example, the database can be provided with images of objects that should be picked-up by machine 10, such as wood chips or paperclips, and objects that should be avoided for later recovery by an operator, such as manufactured parts or coinage. In an example, object recognition sensor 46 comprises a camera that can take images of an object in front of machine 10. If objects are identified that are not in the library, control panel 18 can direct machine 10 to pick-up the object, or, if identified objects are in the library, control panel 18 can direct machine 10 to not pick-up the object. If an object has been identified for not being picked-up, control panel 18 can send a signal to remote device 33 to notify a remote operator that there is an object in the cleaning path that needs to be safely recovered. Control panel 18 can also reroute machine 10 around the object to continue the cleaning operation. Control panel 18 can later direct machine 10 to the location of the identified object to again attempt to clean that portion of the floor.

Machine 10 can include various sensors or devices for detecting whether or not various cleaning instruments, components, sensors or other devices are attached to machine 10. For example, machine 10 can include cleaning media sensor 52. In the illustrated example, cleaning media sensor 52 can be located on a non-rotating component, such as pad housing 76 or a pad skirt, in close proximity to pad 60. Media sensor 52 can be in electronic communication with control panel 18 and can send a signal to control panel 18 if pad 60 is not detected. If control panel 18 receives an indication that pad 60 is not present, which can indicate pad 60 was not mounted to housing 76, not mounted properly to housing 76 or has become separated or partially separated from housing 76 during the cleaning operation, control panel 18 can send a wireless signal to remote device 33 to notify a remote operator of machine 10. Additionally, control panel 18 can stop operation of one or both of scrubber 30 and machine 10.

Likewise, machine 10 can include squeegee sensor 54. In the illustrated example, sensor 54 can be located on a frame member of squeegee 32, such as squeegee cover 78, in close proximity to blade 66. Sensor 54 can be in electronic communication with control panel 18 and can send a signal to control panel 18 if blade 66 is not detected. Also, squeegee sensor 54 can be configured to sense if all of squeegee 32 detaches from machine 10 at corresponding mounting hardware. If control panel 18 receives an indication that blade 66 is not present, which can mean blade 66 was not mounted to cover 78, not mounted properly to cover 78 or has become separated or partially separated from cover 78 during the cleaning operation, control panel 18 can send a wireless signal to remote device 33 to notify a remote operator of machine 10. Additionally, control panel 18 can stop operation of one or both of squeegee 32 and machine 10.

Sensors 52 and 54 can comprise a proximity sensor of any known variety, such as capacitive-, Doppler-, eddy current-, inductive-, laser-, magnetic- and optical-based sensors. Sensors 52 and 54 can be configured to directly sense the cleaning component directly or can be configured to detect an operable component mounted to the cleaning component, such as a reflector or magnet. Sensors 52 and 54 can also be mounted to view or contact the cleaning component through a window in the structural member of machine 10 to which they are mounted.

The recovery system can also include one or more sensors to facilitate operation of the recovery system. For example, tank level sensor 80 and tank condition sensor 82 can be included in the recovery system to communicate information to control panel 18. Tank level sensor 80 can determine the level of liquid or dirty cleaning solution in recovery tank 70. Sensor 80 can determine if tank 70 is full or nearly full. Additionally, sensor 80 can be configured to provide indications of the level of tank 70 as it progresses from being empty to full. In various examples, sensor 80 can determine the level at a plurality of discrete levels or at continuous levels. In an example, sensor 80 can comprise a conventional fluid level sensor, such as an ultrasonic sensor, a capacitive sensor, an optical interface sensor, or a microwave sensor. Sensor 80 and control panel 18 can also be configured to estimate a time remaining before recovery tank 70 is full. In an example, control panel 18 can reduce or shut-off the flow of dirty cleaning solution to tank 70 before activating the closure of a shut-off valve in recovery tank 70 if control panel 18 receives a signal from sensor 80 indicating tank 70 is nearly full or full. Control panel 18 can send a wireless signal to remote device 33 to notify a remote operator of machine 10 that tank 70 is full. Additionally, control panel 18 can stop operation of machine 10 if tank 70 is indicated by sensor 80 as being full. In another example, sensor 80 or an additional sensor can be positioned on tank 70 to determine the level of cleaning solution remaining within tank 70.

In another example, sensor 80 can be configured as a dirt sensor for recovered liquid. In such an example, sensor 80 can be configured to detect the level of dirt in the solution, such as by determining how much light can pass through the recovered liquid. Electronics within control panel 18 can compare the signal from sensor 80 to a threshold cleanliness level stored in memory in control panel 18. If excessively dirty water is sensed, control panel 18 can take corrective action in a reactive manner. If control panel 18 detects dirty water, control panel 18 can adjust the cleaning operation to be performed by machine 10. For example, control panel 18 can adjust the route of the cleaning path so that machine 10 makes an additional pass of the dirty area. Control panel 18 can be configured to determine if enough cleaning solution remains in tank 70 to complete a cleaning operation.

Tank condition sensor 82 can be attached to tank 70 to evaluate a condition of tank 70, such as the cleanliness of tank 70. Sensor 82 can provide an indication at control panel 18 as to whether or not tank 70 needs to be cleaned. In an example, sensor 82 can be an olfactory sensor that can determine when odor levels reach or exceed a predetermined threshold. In another example, sensor 82 can be configured as a capacitive sensor positioned on the outside of tank 70 near a drain and can sense if dirt, grime or debris is building up inside tank 70 near the drain. In one scenario, machine 10 could autonomously park itself in a cleaning closet after completing a cleaning operation and have recovery tank 70 full of dirty cleaning solution, which, after a period of time can begin to have an undesirable or unpleasant smell. Sensor 82 can be used to alert an operator to this condition so that recovery tank 70 can be cleaned.

Machine 10 can be provided with vibration sensor 50 that can be configured to detect potential fault conditions. In an example, vibration sensor 50 can be configured as a microphone that can detect changes in sound that may indicate a fault condition. For example, a microphone can listen for loud or unusual sounds that may be correlated to an object impacting machine 10, grinding of pad 60, vibration from an offset pad 60, splashing cleaning solution or the like. Sounds monitored by sensor 50 can be compared to a library of sound recordings of various fault conditions for comparison. The library of fault condition sound recordings can be stored in memory in control panel 18 or can be stored remotely in a database (e.g., the Internet or a local area network) that control panel 18 can access via a wireless communicate signal. Sensor 50 can monitor for operation of machine 10 that falls outside of a sound or vibration signature that corresponds to steady state operation. For example, a fault condition might be a vibration frequency that would match vibration of scrubber 30 if pad 60 is off center. Vibration sensor 50 can also be positioned and configured to sense loading of platform 20. If control panel 18 detects that a passenger has boarded machine 10 during autonomous operation, control panel 18 can be configured to cease operating until the load has been removed.

In another example, vibration sensor 50 can be configured as an accelerometer or other vibration sensor that can detect changes in vibration that may indicate a fault condition. Vibration sensor 50 can be connected to chassis 24 to monitor for undesirable acceleration of machine 10. For example, vibration sensor 50 can monitor for unnecessary or undue acceleration of machine 10 along the cleaning path, which may provide an indication of an undesirable cleaning speed, or vibration sensor 50 can monitor for acceleration of machine 10 in an undesirable direction, such as an upward acceleration when machine 10 impacts a bump. Detected fault conditions can be transmitted to remote device 33 to provide a remote operator an indication that a fault condition may have occurred. Additionally, control panel 18 can stop operation of machine 10 if a sound or vibration is sensed that may be detrimental to machine 10 or the cleaning operation.

Machine 10 can include floor type sensor 48 that can enable control panel 18 to distinguish between different floor surfaces. For example, sensor 48 can be configured to distinguish between floor surfaces of different textures, such as smooth or rough, or resiliency, such as hard or soft. Smooth or hard surfaces can be indicative of concrete or tile, while rough or soft surfaces can be indicative of carpet or turf. In various examples, sensor 48 can comprise a vision system, a sonar sensor, a laser, or other known sensing methods that can be used to distinguish floor types. For example, sensor 48 can measure the reflection of an initial signal to determine a magnitude of the initial signal that is returned to sensor 48, with lower magnitudes of reflected signal possibly indicating softer or rougher surfaces. Signals from sensor 48 can be compared by control panel 18 to a library of known floor type signals that can be stored in control panel 18 or a remote database for comparison over a wireless communication signal. Control panel 18 can include instructions for reacting to signals from sensor 48 indicating sensed floor types. For example, control panel 18 can be programmed to prevent machine 10 from entering a carpeted area when set-up for scrubbing of a hard floor such as concrete. Control panel 18 can send a signal to remote device 33 if it is determined that machine 10 has entered an undesirable or unauthorized area. Additionally, control panel 18 can stop operation of machine 10 if machine 10 enters an area having a floor type that machine 10 has been instructed to avoid.

Machine 10 can include sprayer 41 for operating machine 10 in, for example, a carpet pre-spray mode. A carpet pre-spray mode can be used for pre-spraying carpet prior to cleaning with scrubber 30 or extraction with a vacuum system in examples where a vacuum cleaning system is employed in place of or combination with scrubber 30. Sprayer 41 can be connected to a tank of liquid that can be sprayed onto the floor in front of machine 10 via a nozzle or the like with the use of a pump. In an example, sprayer 41 can use the same liquid as the liquid system stored in the tank within main cowling 40 and can use the same pump as the liquid system uses for providing cleaning solution or liquid to scrubber 30. In another example, machine 10 can use the aforementioned liquid system to perform the pre-spraying operation. Sprayer 41 can also be connected to a detergent tank within the liquid system of machine 10 to apply detergent during the pre-spraying operation. However, sprayer 41 can be used to apply clear water without detergent to perform a clean water rinse.

Pre-spray PS applied by sprayer 41 can be applied along the intended cleaning or extraction path. Machine 10 can follow the intended path before the cleaning or extraction process at a faster or slower pace than what is conducted during the subsequent cleaning or extraction process. Autonomous pre-spraying can facilitate the cleaning operation because pre-spraying can be a difficult operation to manually perform. For example, it can sometimes be difficult for an operator to see where the subsequent paths of machine 10 should be because the pre-spraying dampens and darkens the entire carpeted area, making it difficult to see where the next pre-spraying path should be or making the entire path for subsequent cleaning operation more difficult to see. The pre-spraying operation can save labor expense by freeing the operator to do other tasks while the pre-spraying operation is autonomously performed. Additionally, autonomous performance of the pre-spraying operation can reduce the total time to perform the pre-spraying operation by more precisely executing the pre-spray route, e.g., avoiding double spraying of portion of the floor that can sometimes occur during manual pre-spraying operations.

Machine 10 can include projector 42 that can be configured to project a route of the cleaning path on the floor surface to be cleaned. Projector 42 can be configured to project a laser, LED, or other light source onto the floor ahead of machine 10 to show the intended path of machine 10. The intended path can be projected a short distance (e.g., 2-10 feet/0.61-3.05 m) in front of machine 10 as machine 10 moves along the intended path of the route. Projector 42 can thus facilitate autonomous movement of machine 10 by warning pedestrians and other bystanders of the route that machine 10 is taking. Light beam LB can be projected to the left or right of machine 10 as a turn is approached to notify pedestrians of a forthcoming movement of machine 10.

Remote device 33 can be configured to communicate with control panel 18 and provide a remote operator of machine 10 with information regarding the operation and status of machine 10, including the liquid system, scrubber 30, squeegee 32, the recovery system and the navigation system, as is discussed in greater detail with reference to FIG. 5. Remote device 33 can also be configured to provide a command input to control panel 18 to stop or change operation of machine 10 or the cleaning operation.

Figure 5:
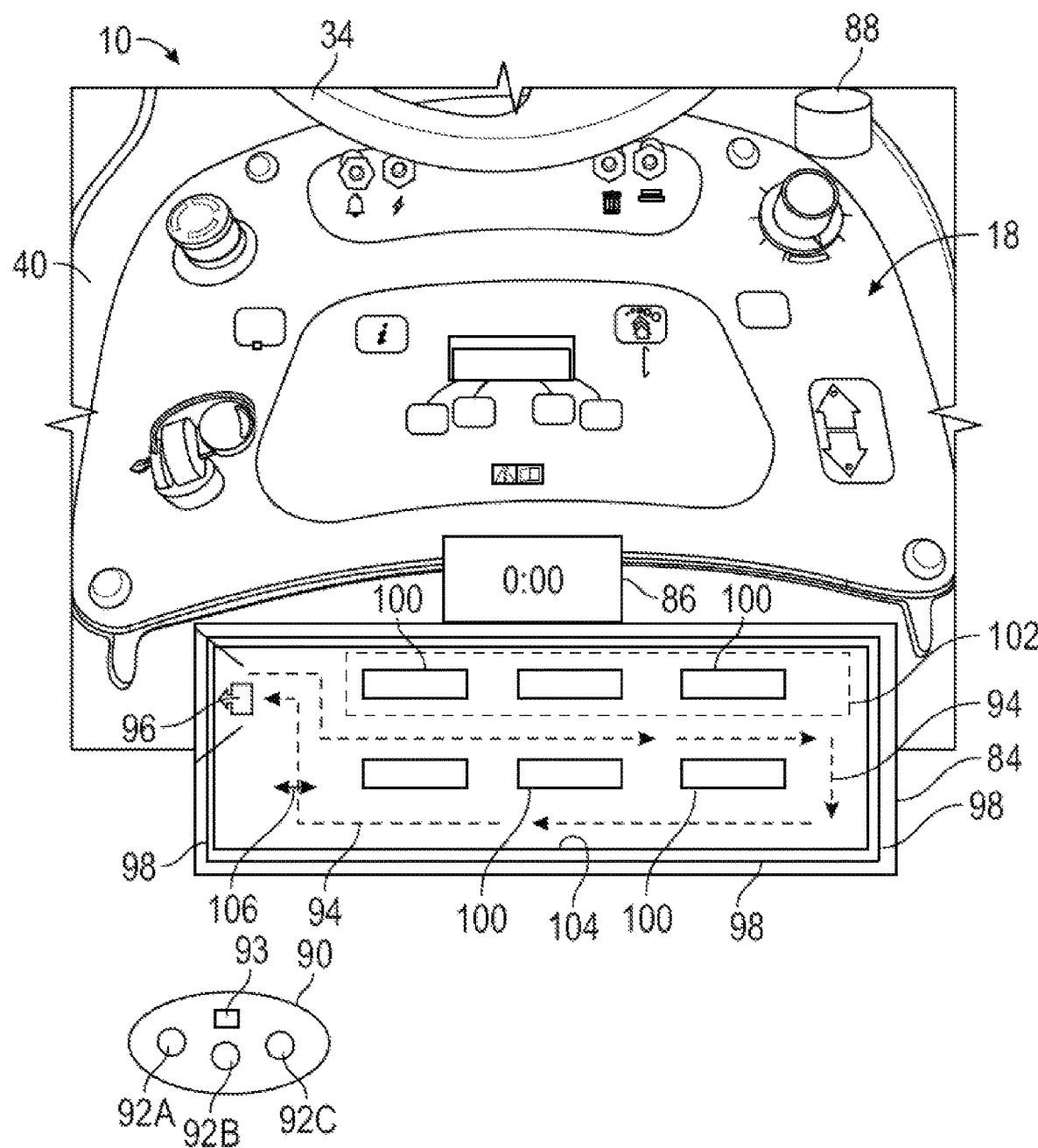
FIG. 5 is a schematic diagram of the control panel for the robotic floor cleaning machine of FIGS. 2 and 3 showing a graphical user interface panel and a wirelessly connected remote device.

FIG. 5 is a schematic diagram of control panel 18 for floor cleaning machine 10 of FIGS. 2 and 3 showing graphical user interface panel 84, status bar 86, wireless communication link 88 and wirelessly connected portable fob 90 having indicator lights 92A, 92B and 92C.

As discussed above, control panel 18 can be configured to operate the various sub-systems, components, sensors and devices of machine 18 from a single location where an operator can stand on platform 20. Control panel 18 therefore can include various hardware and software components for operating machine 10. For example, control panel 18 can include user interface devices, processors, memory and the like for receiving input from various items, such a signals from sensors 44A, 44B, 46, 48, 50, 52, 54, 80 and 82, and providing output to various items, such as fob 90 and motors 56, 58 and 68. Control panel 18 can include various forms of digital memory for storing the various libraries and databases described herein, as well as programming for executing various cleaning instructions and commands, as described herein. In one example, control panel 18 is can include a portable computing device, such as a tablet computer, as the operator interface. The portable computing device can be configured to have complete or partial control over the operations of machine 10.

Control panel 18 can include a wireless hub, such as wireless communication link 88, that permits control panel 18 to communicate with devices external to machine 10. Communication link 88 allows control panel 18 to access data and control other devices or autonomous machines.

In one example, wireless communication link 88 communicates with a wireless local area network that permits communication with a local database or server at the location of machine 10 (e.g., within the same facility). In another example, wireless communication link 88 can be a Bluetooth communication device. In another example, wireless communication link 88 is able to connect to the Internet via various public or private signals, such as cellular or 4G networks and the like. Likewise, wireless communication link 88 can be configured to communicate directly with remote device 33 and fob 90, or indirectly, such as through a network or Internet connection.

Fob 90 can comprise a portable device that can be carried by an operator of machine 10 while machine 10 is operating autonomously. In an example, fob 90 is sized and shaped to be small enough to fit into a pocket of an operator of machine 10. As such, fob 90 and wireless communication link 88 can transmit information between each other over a distance so that the operator can leave the immediate vicinity of machine 10 to do other activities, such as in the same facility as machine 10. In examples, fob 90 communicates with Bluetooth or a wireless local area network.

In the example of FIG. 5, fob 90 is configured as a pocket-sized device having three visual indicator lights 92A, 92B and 92C and button 93. In an example, light 92A can be a green light, light 92B can be a yellow light, and light 92C can be a red light. Lights 92A, 92B and 92C can be activated by control panel 18 to indicate various statuses of machine 10. For example, a solid green light can indicate machine 10 is operating properly as desired, a red light can indicate that machine 10 has stopped operating and cannot continue without operator interaction, and a yellow light can indicate that machine 10 has encountered a condition that needs operator attention, but that machine 10 can continue to operate. In other examples, lights 92A, 92B and 92C can blink in predetermined patterns to provide more specific information, such as a potentially failed blade 66, a potentially failed pad 60 or a full recovery tank 70. Lights 92A, 92B and 92C can also be turned on to indicate that a cleaning operation has been completed. Additionally, lights 92A, 92B and 92C can be turned on to provide information relating to the autonomous navigation of machine 10, such as to provide information that an object is blocking the cleaning path route, that machine 10 is lost, or that machine 10 is stalled.

Fob 90 can also include button 93 or other interface components to allow an operator of machine 10 to remotely stop operation of machine 10. Although explained with reference to remote device 33 comprising fob 90, other portable remote devices can be used with control panel 18 and machine 10. In other examples of portable device 33, a handheld or mobile computing device, such as a phone, notebook computer or tablet computer can be used to communicate explicit, textual information to the operator regarding the state of machine 10 or the cleaning operation. In various examples, fob 90 includes a graphical display that can show pictures taken by a camera on machine 10. For example, object recognition sensor 46 can take a picture of an obstruction in front of machine 10 for display on fob 90 for a remote operator to evaluate.

Control panel 18 can visually communicate the intended route for the cleaning path of machine 10 using graphical user interface (GUI) panel 84. GUI panel 84 can comprise a touch screen as is known in the art, a liquid crystal display or any similar digital or analog screen for communicating information. GUI panel 84 can include indicia in the form of a map, an icon, text, or other identifiable representation. For example, GUI panel 84 can graphically show a representation of cleaning route 94 using machine icon 96 relative to walls 98 and objects 100. GUI panel 84 can allow for an operator to choose between multiple routes, such as route 94 and an alternative route.

A route for machine 10, can be programmed by a plurality of different methods. In one example, in a "copy-cat" mode, machine 10 can learn a route by copying the exact route driven by an operator using platform 20 and steering wheel 34. For example, control panel 18 can learn the turns of route 94, such as the seven legs of route 94 shown in FIG. 5. Control panel 18 can be programmed to copy cleaning operation steps initiated by an operator during the "copy-cat" mode, such as doubles-scrub actions or changes in cleaning fluid flow rate. Control panel 18, however, can include programming to smooth out the path driven by the operator. For example, control panel 18 can take out slight drifting or back-and-forth driving patterns of the operator, or fill in any missed areas by the operator. Control panel 18 can also optimize the overlap of adjacent legs of the cleaning path forming each route to minimize double cleaning and ensure complete cleaning coverage.

In another example, in a "fill-in" mode, control panel 18 can generate a route for cleaning the interior area of a perimeter determined by the operator. The operator can drive machine 10 around the outer boundaries of an area and control panel 18 can optimize the route for machine 10 to clean that area. For example, machine 10 could be ridden by an operator adjacent walls 98 in FIG. 5 to form a rectangular shaped perimeter and control panel 18 could generate the cleaning route, such as by generating the seven legs of route 94 shown in FIG. 5. The operator can also program one or more islands 102 into the area that are no-go or "keep out" zones for machine 10. Thus, because machine 10 will have driven the demarcation lines for the route, machine 10 will also know the distances between the boundaries of the demarcated area and can determine the optimal route and overlap for each leg of the cleaning path route. Control panel 18 can provide feedback confirming that the area within the perimeter has been mapped, such as by lighting up status light system 36.

Whether machine 10 utilizes a "copy-cat" mode or a "fill-in" mode can be a user selected option on control panel 18. Control panel 18 can execute the "copy-cat" mode or a "fill-in" modes by utilizing the two-dimensional and three-dimensional mapping conducted by optical sensors 12A and 12B, distance sensors 14A and 14B, and laser scanner 36 described above, as well as the positional data obtained for wheels 26A, 26B and 28. Thus, the location of objects detected by optical sensors 12A and 12B, distance sensors 14A and 14B, and laser scanner 36 can be plotted relative to the location of machine 10 using the positional wheel information.

For rooms or areas that are repetitively cleaned, control panel 18 can be programmed to minimize or mitigate the risk of machine 10 imparting repetitive wear damage to the floor to be cleaned. In one example, control panel 18 can be programmed to plot route 94 along walls 98 a random distance from walls 98 to form buffer zone 104. Machine 10 can be programmed to nominally space cleaning route 94 a distance of approximately 2 inches (~5 cm) from walls 98, e.g., buffer zone 104 is approximately 2 inches (~5 cm) wide. If the nominal spacing is repeated during subsequent cleaning operations, over time a distinct line can begin to form between the cleaned and un-cleaned area showing the cleaning path. Thus, control panel 18 can be programmed to vary the nominal spacing distance in successive cleaning operations. Cleaning route 94 can be varied inside and outside of the nominal spacing distance. For example, the first time machine 10 cleans a room, the nominal spacing distance can be used; the next time machine 10 cleans that same room, the cleaning path can be moved to be spaced approximately 1.75 inches (~4.5 cm) from the wall; in the next cleaning operation, the cleaning path can be moved to be spaced approximately 2.5 inches (~5.7 cm) from the walls; and so on.

In additional examples, control panel 18 can be programmed to add similar slight variation to the entire path of route 94, not just those portions along wall 98. For example, a small, random lateral offset 106 can be added to route 94 of the cleaning path to one or the other side of the middle of route 94 to avoid visible wear patterns from forming in regularly cleaned areas.

As discussed above, control panel 18 can be programmed to use optical sensors 12A and 12B, distance sensors 14A and 14B, and laser scanner 36 to guide machine 10 autonomously. As such, machine 10 can be programmed to always know where it is within a particular building or facility. Control panel 18 can be programmed to recognize the same objects or type of object repeatedly recognized as being in a cleaning area or in the cleaning path. For example, using input from object recognition sensor 46, control panel 18 can catalogue the frequency that a particular object, such as object 100 or walls 98, is in the cleaning area in the same place. Thus, control panel 18 can learn where permanent objects such as walls or semi-permanent objects, such as vending machines, are located vs. where movable objects, such as chairs, are located. For objects that control panel 18 recognizes as having not moved from previous cleaning operations, control panel 18 can execute the cleaning path route without alteration. For objects that control panel 18 recognizes as typically being in the same place, but not currently in place, control panel 18 can decide to clean the space that is not currently occupied. As an illustration of this example, control panel 18 can recognize that tables in a cafeteria are typically there and can accordingly execute a cleaning path route that travels between the tables. However, if control panel 18 recognizes that one or more of the tables are not present, control panel 18 can recognize that the tables are not present and can make a decision to change the route of the cleaning path to include cleaning the areas where the tables typically reside. For objects that control panel 18 recognizes are in random locations for each cleaning operation, control panel 18 can recognize that these are potentially moving objects and can continue conducting the desired cleaning operation until the recognized object comes within a buffer zone of machine 10, as can be implemented using sensors 12A and 12B, distance sensors 14A and 14B, and laser scanner 36. If the identified moving object enters the machine buffer zone, control panel 18 can slow down movement of machine 10 and eventually stop machine 10 if the identified moving object continues to obstruct the cleaning path. Control panel 18 can be programmed to restart the cleaning operation, after a delay period, if the identified moving object is no longer detected. Alternatively, after the delay period, if the identified moving object remains in the cleaning path, control panel 18 can instruct machine 10 to move around the object and restart the cleaning operation along the route (e.g., route 94) of the cleaning path on the other side of the object. As an illustration of this example, control panel 18 can recognize that a forklift typically operates in a warehouse and can therefore recognize that the forklift may be moving in and out of the cleaning path route, or may be temporarily parked on a single location for a period of time; control panel 18 can therefore take appropriate action to continue the cleaning operation without having to completely stop or wait for operator interaction as the forklift operates in the presence of machine 10.

Control panel 18 can be programmed to perform different actions depending on where it is located, what day of the week the cleaning operation is being performed, or what time of day the cleaning operation is being performed. For example, after machine 10 recognizes where it is at, as previously discussed, control panel 18 can be programmed to change the cleaning operation based on a time of day. For example, if control panel 18 recognizes that machine 10 is located in a warehouse during workday hours, say from 7:00 am to 6:00 pm, control panel 18 can be programmed to conduct a quick cleaning operation that dispenses the least amount of moisture on the floor and takes the least amount of time. However, if control panel 18 recognizes that machine 10 is located in a warehouse during non-workday hours, say from 6:00 pm to 7:00 am, control panel 18 can be programmed to conduct a more thorough cleaning operation that might be slower and dispenses a greater amount of moisture on the floor. Factors that can be adjusted by control panel 18 to adjust the speed and thoroughness of the cleaning operation can include flow rate of the cleaning solution, brush pressure, speed of machine 10, use of cleaning additives, etc. Furthermore, control panel 18 can be configured to self-start a particular cleaning operation at scheduled times and intervals. For example, the aforementioned quick cleaning operation can be programmed into control panel 18 to be autonomously executed at 2:00 pm during a break period of a workday, while the aforementioned more thorough cleaning operation can be programmed into control panel 18 to be autonomously executed at 2:00 am while the warehouse is unoccupied.

In another example, machine 10 can park itself in a docking station. The docking station can be configured to autonomously reload machine 10 for additional operations. For example, the docking station can be configured to wirelessly or with wires recharge battery 74, fill battery 74, fill the solution tank within cowling 40, drain recovery tank 70, rinse recovery tank 70, clean and/or change cleaning mediums, such as pad 60, fill a detergent tank, and perform other maintenance or diagnostic procedures.

Control panel 18 can be programmed to provide status updates to an operator of machine 10 at GUI panel 84. For example, at least one of the amount of time, the amount of solution, or the battery capacity needed to complete a selected cleaning operation can be displayed at status bar 86. GUI panel 84 can also provide an indication of there is sufficient time, such as before workday hours begin, to complete the selected cleaning operation, or sufficient battery power or cleaning solution to complete the selected cleaning operation. As such, control panel 18 can be operatively coupled to battery 74, tank 70, the tank within main cowling 40 and other sensors of machine 10 and GUI panel 84.

Additionally, control panel 18 can be programmed to provide remote device 33, such as fob 90, a status update, including a project completion status or estimate. Control panel 18 can estimate how much time will be required to complete the selected cleaning operation and can communicate to fob 90 an indication that the cleaning operation is complete, such as by flashing all three of lights 92A-92C or flashing all three of lights 92A-92C. Additionally, control panel 18 can provide a warning that the cleaning operation is about to be complete, such as by flashing one or more of lights 92A-92C at preset amount of time, such as five minute, before the cleaning operation is complete. The completion warning can allow the operator of machine 10 time to travel to machine 10 so that the operator can arrive before or at the time machine 10 will be ceasing operation. Remote device 33 can also be configured to vibrate or produce an audible sound to alert a remote operator of machine 10 to a condition of the driving or cleaning process.

Control panel 18 can be programmed to coordinate operation of machine 10 with other robotic floor cleaning machines. In an example, control panel 18 can include hardware to permit machine 10 to transmit a signal that scans for signals from other machines using similar hardware in a similar control panel as control panel 18. Once the machines recognize each other, they can be programmed to communicate and exchange information. For example, control panel 18 can include a Bluetooth transmitter, or another wireless communication device, to recognize when there are one or more additional floor cleaning machines operating in a common area so that control panel 18 can coordinate execution of the cleaning operation with the other machines. In an example, the route (e.g., route 94) of the cleaning path can be divided between machines to expedite execution of the cleaning operation, e.g., reduce the time it takes to carry out the cleaning operation. In an example, the entire cleaning plan can be shared amongst all of the machines, or only a portion of the route of the cleaning path can be communicated to particular machines for cleaning only a portion of the total area to be cleaned. The communication between machines can ensure that the machines do not interfere with operation of each other. For example, each machine can have only a portion of the route of the cleaning path so that they do not collide along the route. Also, the communication between machines can actively communicate to prevent collisions, such as by actively communicating the location of each connected machine to every other machine with a common frame of reference, such as the floor surface to be cleaned or the route of the cleaning path. The location of each machine can be transmitted in coordinate form or the like for plotting or locating in the mapped area.

Additionally, machine 10 can be configured to operate with other autonomous guided vehicle (AGV) systems that are different than machine 10. As such, control panel 18 can include various communication systems for transmitting and receiving information using a plurality of protocols. For example, other vehicles, such as fork trucks, delivery vehicles, etc., might be working or operating in the same area as machine 10. Control panel 18 can be used to communicate the location of machine 10 to these vehicles in a format those vehicles can use to make adjustments to their operation, e.g., avoid collisions, engage a vehicle-passing protocol, etc. Likewise, control panel 18 can adjust the operation of machine 10 to avoid collision with other AGVs.

Vehicle 10 can be provided with the navigation system described herein as a modular kit. Optical sensors 12A and 12B, distance sensors 14A and 14B and laser scanner 36, as well as the other sensors and devices described herein, can be connected to vehicle 10 using releasable couplers, such as suction cups, ball and socket couplers and the like, such that the devices can be attached to different machines. Likewise, the electronics of control panel 18 and other components and wiring of machine 10 and the navigation system can be provided with wire harnesses and connectors that allow for quick and easy physical and electrical installation of components to a machine. Control panel 18 can be programmed to utilize optical sensors 12A and 12B, distance sensors 14A and 14B and laser scanner 36 with different machines. In particular, the various geometric footprints, envelopes and dimensions of any particular machine can be entered into memory in control panel 18. For example, the different length, width, and height dimensions, wheel configurations (e.g., wheel base), and cleaning deck configurations (e.g., deck width) can be entered and stored into control panel 18 to change how the navigation software within control panel 18 determines the navigation and cleaning commands, such as turning radius and distances from objects. Optical sensors 12A and 12B, distance sensors 14A and 14B and laser scanner 36, as well as the other sensors and devices described herein, can also be adapted to operate with different machines via software or firmware configurations based on the entered footprints, envelopes and dimensions. Control panel 18 can include user input options to allow an operator to input the particular parameters of a machine to be used with the modular navigation system. Alternatively, control panel 18 can be automatically updated, such as via firmware, with the particular parameters of a machine from a technician or factory update to avoid data entry errors.

The autonomous or robotic floor cleaning equipment described herein provides advantages over manual systems and previous autonomous systems. More efficient autonomous operation provided by the systems and methods described herein can reduce labor costs by allowing an operator of an autonomous cleaning machine to perform other tasks while the autonomous machine operates. Additionally, the cleaning operations can be more consistently or systematically performed, such that spots are not missed or cleaning is duplicated, thereby reducing or eliminating rework. Autonomous machines can also be programmed to concentrate on high-use or particularly dirty areas rather than manual operators that tend to clean all areas equally, including those that have not been dirtied. Autonomous cleaning system are particularly advantageous for use in large open areas where the cleaning operation involves long intervals of repeated, back-and-forth operations. The systems and methods described herein facilitate and improve autonomous navigation and autonomous cleaning operations to expand the advantageous use of autonomous cleaning machines to other spaces that are not as simply cleaned as open areas. For example, systems and methods described herein allow the autonomous cleaning machine to be used in tight spaces that may utilize unique, non-repetitive route instructions or in spaces where pedestrian traffic might be present. The systems and methods of autonomous navigation and cleaning described herein can also reduce cleaning time of autonomous machines be reducing the amount of time the autonomous machine may be performing an ineffective cleaning operation, such as when a cleaning pad or squeegee blade fails.

VARIOUS NOTES & EXAMPLES

Example 1 can include or use subject matter such as an a control system for a robotic floor cleaning machine configured to perform a cleaning operation along a cleaning path, the control system comprising: a controller configured to control autonomous movement of the robotic floor cleaning machine along the cleaning path and autonomous performance of the cleaning operation; and a plurality of sensors configured to sense a location of the robotic floor cleaning machine relative to surroundings of the robotic floor cleaning machine; wherein at least two sensors from the plurality of sensors are configured to locate the robotic floor cleaning machine in overlapping areas of the surroundings.

Example 2 can include, or can optionally be combined with the subject matter of Example 1, to optionally include a plurality of sensors that can be selected from the group consisting of: laser sensors, sonar sensors, stereo camera sensors, infrared sensors, capacitive sensors, and wheel position sensor sensors.

Example 3 can include, or can optionally be combined with the subject matter of one or any combination of Examples 1 or 2 to optionally include at least two sensors that can comprise: a dirt sensor configured to detect objects alongside the machine along the cleaning path; and a capacitance sensor configured to detect objects alongside the machine above the cleaning path.

Example 4 can include, or can optionally be combined with the subject matter of one or any combination of Examples 1 through 3 to optionally include at least two sensors that can comprise: a laser scanner configured to map the surroundings alongside the machine; and an optical sensor configured to visually record the surroundings alongside the machine.

Example 5 can include, or can optionally be combined with the subject matter of one or any combination of Examples 1 through 5 to optionally include at least two sensors that can comprise: an object recognition sensor configured to view the presence of objects in the surroundings; and an optical sensor configured to visually record the surrounding alongside the machine.

Example 6 can include, or can optionally be combined with the subject matter of one or any combination of Examples 1 through 5 to optionally include at least two sensors that can comprise: a wheel position sensor configured to determine a distance the machine has moved in the surroundings; and a laser sensor configured to sense a distance between the machine and an object in the surroundings.

Example 7 can include, or can optionally be combined with the subject matter of one or any combination of Examples 1 through 6 to optionally include a controller further comprising: a chassis configured to move along the cleaning path; a cleaning mechanism mounted to the chassis to perform the cleaning operation; means for facilitating the autonomous performance of the cleaning operation; and means for facilitating the autonomous movement of the chassis.

Example 8 can include, or can optionally be combined with the subject matter of one or any combination of Examples 1 through 7 to optionally include means for facilitating autonomous performance of the cleaning operation that can comprise a debris sensor in communication with the controller and positioned to determine debris in the cleaning path for comparison to a baseline reference.

Example 9 can include, or can optionally be combined with the subject matter of one or any combination of Examples 1 through 8 to optionally include means for facilitating autonomous performance of the cleaning operation that can further comprise a pre-cleaning operation cleaning medium coupled to a front end of the chassis, wherein the debris sensor is located on the pre-cleaning operation cleaning medium.

Example 10 can include, or can optionally be combined with the subject matter of one or any combination of Examples 1 through 9 to optionally include means for facilitating autonomous performance of the cleaning operation that can further comprise a post-cleaning operation cleaning medium coupled to a rear end of the chassis, wherein the debris sensor is located on the post-cleaning operation cleaning medium.

Example 11 can include, or can optionally be combined with the subject matter of one or any combination of Examples 1 through 10 to optionally include means for facilitating autonomous performance of the cleaning operation comprises an object recognition sensor comprising a camera in communication with the controller, wherein the controller is configured to compare images of objects from the camera to a database of reference images to identify the objects.

Example 12 can include, or can optionally be combined with the subject matter of one or any combination of Examples 1 through 11 to optionally include means for facilitating autonomous performance of the cleaning operation that can comprise a surface recognition sensor comprising a sensor in communication with the controller and configured to recognize a texture of a surface to be cleaned.

Example 13 can include, or can optionally be combined with the subject matter of one or any combination of Examples 1 through 12 to optionally include means for facilitating autonomous performance of the cleaning operation that can comprise a vibration sensor in communication with the controller and configured to recognize disruptions in the movement of the chassis.

Example 14 can include, or can optionally be combined with the subject matter of one or any combination of Examples 1 through 13 to optionally include means for facilitating autonomous performance of the cleaning operation that can comprise a sensor for the cleaning mechanism in communication with the control system and configured to determine the presence of a cleaning medium connected to the cleaning mechanism.

Example 15 can include, or can optionally be combined with the subject matter of one or any combination of Examples 1 through 14 to optionally include means for facilitating autonomous performance of the cleaning operation that can comprise a pre-sprayer in communication with the control system and mounted to a front end of the chassis to spray into the cleaning path.

Example 16 can include, or can optionally be combined with the subject matter of one or any combination of Examples 1 through 15 to optionally include a controller that can include a clock and the control system can perform different cleaning operations based on a time of the clock.

Example 17 can include, or can optionally be combined with the subject matter of one or any combination of Examples 1 through 16 to optionally include a controller that can include a display and the control system is configured to provide an indication of a magnitude of a parameter required for completing the cleaning operation.

Example 18 can include, or can optionally be combined with the subject matter of one or any combination of Examples 1 through 17 to optionally include a controller that can include an electronic communication device and the control system is configured to communicate a route for the cleaning path to another robotic floor cleaning machine.

Example 19 can include, or can optionally be combined with the subject matter of one or any combination of Examples 1 through 18 to optionally include a status indicator in communication with the control system for providing a visual indication of a status of the robotic floor cleaning machine.

Example 20 can include, or can optionally be combined with the subject matter of one or any combination of Examples 1 through 19 to optionally include a portable device configured to wirelessly communicate with the control system and display a status of the robotic floor cleaning machine.

Example 21 can include, or can optionally be combined with the subject matter of one or any combination of Examples 1 through 20 to optionally include a projector coupled to the chassis to project an indication of the cleaning path on a surface to be cleaned.

Example 22 can include, or can optionally be combined with the subject matter of one or any combination of Examples 1 through 21 to optionally include a controller that can further comprise a display visually indicating a route of the cleaning path.

Example 23 can include, or can optionally be combined with the subject matter of one or any combination of Examples 1 through 22 to optionally include a controller that can vary a route for the cleaning path in a predefined area to avoid generating wear patterns.

Example 24 can include, or can optionally be combined with the subject matter of one or any combination of Examples 1 through 23 to optionally include a controller that can vary a distance of a route of the cleaning path from a fixed object to avoid generating wear patterns.

Example 25 can include, or can optionally be combined with the subject matter of one or any combination of Examples 1 through 24 to optionally include a controller that can vary an overlap of the cleaning path in a route of the cleaning path to avoid generating wear patterns.

Example 26 can include, or can optionally be combined with the subject matter of one or any combination of Examples 1 through 25 to optionally include a clock and the control system that can provide a time indicator correlating to a length of time for completing a route of the cleaning path.

Example 27 can include, or can optionally be combined with the subject matter of one or any combination of Examples 1 through 26 to optionally include a controller that can include a graphical display that is configured to provide an indication of a magnitude of a parameter required for completing the cleaning operation.

Example 28 can include, or can optionally be combined with the subject matter of one or any combination of Examples 1 through 27 to optionally include a sensor for determining the presence of objects in a route of the cleaning path, wherein the control system can make navigation decisions based on a frequency of the objects in the cleaning path.

Example 29 can include, or can optionally be combined with the subject matter of one or any combination of Examples 1 through 28 to optionally include a controller that can receive inputs for a size of the chassis that can be used to determine a route for the cleaning path.

Example 30 can include, or can optionally be combined with the subject matter of one or any combination of Examples 1 through 29 to optionally include: a propulsion system connected to the chassis to provide movement of the chassis along a cleaning path; a liquid system mounted to the chassis to provide cleaning liquid to the primary cleaning mechanism; and a recovery system mounted to the chassis to recover liquid from the cleaning operation.

Example 31 can include, or can optionally be combined with the subject matter of one or any combination of Examples 1 through 30 to optionally include a controller can learn a route for the cleaning path via manual operation of the propulsion system.

Example 32 can include, or can optionally be combined with the subject matter of one or any combination of Examples 1 through 31 to optionally include a controller that can determine a route for a cleaning area within a perimeter determined via manual operation of the propulsion system.

Example 33 can include, or can optionally be combined with the subject matter of one or any combination of Examples 1 through 32 to optionally include means for facilitating autonomous performance of the cleaning operation that can comprise a sensor for the liquid recovery system in communication with the control system.

Example 34 can include, or can optional 33 be combined with the subject matter of one or any combination of Examples 1 through 20 to optionally include a recovery tank for the recovery system, wherein the sensor for the liquid recovery system can comprise a liquid level sensor for the recovery tank.

Example 35 can include, or can optionally be combined with the subject matter of one or any combination of Examples 1 through 34 to optionally include a sensor for the liquid recovery system that can comprise an olfactory sensor for the recovery tank.

Example 36 can include, or can optionally be combined with the subject matter of one or any combination of Examples 1 through 35 to optionally include a sensor for the liquid recovery system that can be configured to determine the presence of a squeegee blade connected to the liquid recovery system.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of controlling a robotic floor cleaning machine in a copy-cat mode, the method comprising:
   executing, with the robotic floor cleaning machine driven by an operator, a series of cleaning operation steps on a route that comprises a leg and a turn;
   recording the route driven by the operator and the series of cleaning operation steps of the robotic floor cleaning machine;
   programming, into a controller of the robotic floor cleaning machine, the series of cleaning operation steps and the route including the leg and the turn;
   smoothing the route driven by the operator, wherein smoothing the route driven by the operator comprises at least one of:
      removing drifting of the robotic floor cleaning machine in the route driven by the operator; and
      filling in areas that were missed by the route driven by the operator; and
   executing, by the robotic floor cleaning machine, the programmed route and series of cleaning operation steps, wherein executing the programmed route and series of cleaning operation steps comprises controlling, with the controller, operation of the robotic floor cleaning machine to execute the same series of cleaning operation steps executed by the operator.

2. The method of claim 1, further comprising:
   detecting, with a sensor of the robotic floor cleaning machine, a location of an object within a cleaning area; and
   plotting the location of the object relative to a location of the robotic floor cleaning machine in the mapped area based on positional data of the robotic floor cleaning machine.

3. The method of claim 1, wherein the series of cleaning operation steps comprises spraying, sweeping, scrubbing, double-scrub actions, vacuuming, corralling, wiping, sucking, polishing, changing in a scrub pressure, changing a concentration of a detergent, changing a speed of the robotic floor cleaning machine, or changing a flow rate of a cleaning fluid.

4. The method of claim 1, further comprising minimizing double cleaning of the leg, the turn, or a combination thereof of the route.

5. The method of claim 1, further comprising optimizing an overlap of adjacent legs of the route.

6. The method of claim 1, wherein executing the series of cleaning operation steps on the route driven by the operator comprises manual operation, by the operator, of a propulsion system of the robotic floor cleaning machine.

7. A method of controlling a robotic floor cleaning machine in a fill-in mode, the method comprising:
   driving the robotic floor cleaning machine continuously along an outer boundary of a cleaning area;
   determining, by the robotic floor cleaning machine, a perimeter of the cleaning area based upon the driven outer boundary;
   determining a mapped area that is within the perimeter;
   generating a cleaning route to clean the mapped area, wherein the cleaning route comprises a leg and a turn;
   optimizing, with a controller, the cleaning route for the robotic floor cleaning machine to clean the mapped area, wherein optimizing the cleaning route comprises:

determining a distance between boundaries of a demarcated area; and determining an optimal route and an overlap of each leg of the cleaning route based on the distance between the boundaries; and controlling, with the controller, the robotic floor cleaning machine to clean the mapped area based on the cleaning route.

8. The method of claim 7, wherein controlling the robotic floor cleaning machine to clean the mapped area comprises controlling the robotic floor cleaning machine to clean the mapped area based on the optimized cleaning route.

9. The method of claim 7, further comprising programming, into the cleaning area, an area designated as inaccessible by the robotic floor cleaning machine.

10. The method of claim 7, wherein the robotic floor cleaning machine comprises a sensor, wherein the sensor comprises at least one of an optical sensor, a distance sensor, a personnel sensor, an ambient light sensor, an ultrasonic sensor, a sonar sensor, a capacitance sensor, a wheel encoder, a dirt sensor, a debris sensor, an object recognition sensor, a floor type sensor, a surface recognition sensor, a vibration sensor, a cleaning media sensor, a squeegee sensor, a tank level sensor, a tank condition sensor, a moisture sensor, an optical interface sensor, a microwave sensor, an olfactory sensor, a stereo camera sensor, an infrared sensor, a wheel position sensor, and a laser scanner.

11. The method of claim 7, further comprising:

detecting, with a sensor of the robotic floor cleaning machine, a location of an object within the cleaning area; and plotting the location of the object relative to a location of the robotic floor cleaning machine in the mapped area based on positional data of the robotic floor cleaning machine.

12. The method of claim 7, further comprises obtaining positional data of the robotic floor cleaning machine based on data provided by at least one of a wheel of the robotic floor cleaning machine, an optical sensor, a distance sensor, a laser scanner, a wheel encoder, a personnel sensor, and a camera.

13. The method of claim 7, wherein determining the mapped area comprises creating a three-dimensional map of the area to be cleaned.

14. The method of claim 7, wherein driving the robotic floor cleaning machine along the outer boundary of the cleaning area comprises:

driving the robotic floor cleaning machine adjacent a wall; and forming a portion of the perimeter of the cleaning area along the wall.

15. The method of claim 7, wherein determining the mapped area comprises obtaining positional data from at least one of a wheel of the robotic floor cleaning machine, an optical sensor, a distance sensor, and a laser scanner of the robotic floor cleaning machine.

16. The method of claim 7, wherein generating the cleaning route comprises generating a leg and a turn of the cleaning route.

17. The method of claim 7, further comprising:

mapping, with a sensor of the robotic floor cleaning machine, the cleaning area; and confirming, with a control panel of the robotic floor cleaning machine, that an area within the perimeter has been mapped.

18. A method of controlling a robotic floor cleaning machine in a copy-cat mode, the method comprising:

executing, with the robotic floor cleaning machine driven by an operator, a series of cleaning operation steps on a route comprising a leg and a turn;

recording the route driven by the operator and the series of cleaning operation steps of the robotic floor cleaning machine;

programming, into a controller of the robotic floor cleaning machine, the series of cleaning operation steps and the route including the leg and the turn;

smoothing the route driven by the operator, wherein smoothing the route driven by the operator comprises removing drifting of the robotic floor cleaning machine of the route driven by the operator; and executing, by the robotic floor cleaning machine, the programmed route and series of cleaning operation steps.

19. The method of claim 18, further comprising:

detecting, with a sensor of the robotic floor cleaning machine, a location of an object within a cleaning area; and plotting the location of the object relative to a location of the robotic floor cleaning machine in the mapped area based on positional data of the robotic floor cleaning machine.

20. The method of claim 18, further comprising minimizing double cleaning of the leg, the turn, or a combination thereof of the route.

21. The method of claim 18, further comprising optimizing an overlap of adjacent legs of the route.

* * * * *